United States Patent [19]

Van Roosmalen

[11] 3,831,058

[45] Aug. 20, 1974

[54] DEVICE COMPRISING A TELEVISION CAMERA TUBE AND TELEVISION CAMERA

[76] Inventor: Johannes H. T. Van Roosmalen, Emmasingel, Eindhoven, Netherlands

[22] Filed: Apr. 26, 1973

[21] Appl. No.: 354,877

Related U.S. Application Data

[63] Continuation of Ser. No. 176,017, Aug. 30, 1971, abandoned.

[52] U.S. Cl. .......... 315/31 R, 315/31 TV, 313/82 R

[51] Int. Cl. .......... H01j 29/56

[58] Field of Search .......... 315/10, 30, 31 R, 31 TV; 313/82 R

[56] References Cited

UNITED STATES PATENTS

| | | | |
|---|---|---|---|
| 2,996,640 | 8/1961 | Eichenbaum | 315/31 R |
| 3,430,092 | 2/1969 | Steiner | 315/10 |
| 3,453,484 | 7/1969 | Miyashiro et al. | 315/31 R |
| 3,501,673 | 3/1970 | Compton | 315/31 R |
| 3,548,250 | 12/1970 | Van Roosmalen et al. | 315/31 TV |
| 3,611,006 | 10/1971 | Eichberger | 315/31 R |
| 3,659,135 | 4/1972 | Van Roosmalen | 315/31 R |

*Primary Examiner*—Benjamin R. Padgett
*Assistant Examiner*—P. A. Nelson
*Attorney, Agent, or Firm*—Frank R. Trifari; Carl P. Steinhauser

[57] ABSTRACT

A device including a television camera tube provided with an electron gun, a focusing gun and a photoconductive layer. The television camera tube has a beam current inertia which is as small as possible. For that purpose, the current density of the electron beam in the electron gun during scanning at any point along the axis between the cathode and the anode is at most three times the current density at the point of intersection of the axis with the cathode. The anode preferably is supplied with a voltage of at most 125 volts. A television camera tube for such a device preferably comprises a grid between the cathode and the anode having an aperture which has a diameter which is at least 20 times as large as the aperture in the anode.

6 Claims, 4 Drawing Figures

INVENTOR.
JAN M. VAN DE GRIEND

BY [signature]

AGENT

PATENTED AUG 20 1974 3,831,058

SHEET 2 OF 3

INVENTOR.
JAN M. VAN DE GRIEND

BY [signature]

AGENT

INVENTOR.
JAN M. VAN DE GRIEND
BY
AGENT

DEVICE COMPRISING A TELEVISION CAMERA TUBE AND TELEVISION CAMERA

This is a continuation of application Ser. No. 176,017, filed 8-30-71, now abandoned.

The invention relates to a device comprising a television camera tube, which television camera tube comprises, aligned along an axis, an electron gun having a cathode and an anode provided with an aperture for producing an electron beam, and a focusing lens for focusing the electron beam on a photoconductive layer which is provided on a signal plate, on which photoconductive layer a potential distribution is formed by projecting on it an optical image, said signal plate supplying electric signals corresponding to the said optical image by the scanning of the photoconductive layer by the electron beam.

The invention also relates to a television camera tube for such a device.

The said potential distribution, sometimes termed potential image, is formed in that the photoconductive layer may be considered as being composed of a large number of picture elements. Each picture element may be considered as a capacitor to which a current source is connected in parallel the current strength of which is substantially proportional to the light intensity on the picture elements. When the light intensity is constant, the charge of each capacitor thus increases linearly with time. As a result of the scanning, the electron beam passes each picture element periodically and discharges the capacitor, that is to say that the voltage across each picture element is periodically reduced to approximately zero. The quantity of charge which is periodically necessary to discharge a capacitor is proportional to the light intensity on the relevant picture element. The associated current flows via the signal plate which all the picture elements have in common, through a signal resistor as a result of which a voltage is formed across the signal resistor which reproduces, as a function of time, the light intensity of the optical image as a function of the place. A television camera tube having the described operation is generally referred to as a vidicon.

One of the aspects of the device of the above-described type is the speed of response, i.e. the speed at which the device reacts to variations in the light intensity. The speed of response is influenced inter alia by the fact that the charge which the electron beam supplies to the picture element in the short period of time in which it passes a given picture element, depends upon the speed distribution of the electrons in the electron beam. This influence of the response rate is termed beam current inertia. The speed distribution of the electrons leaving the cathode depends upon the temperature of the cathode and is referred to as Maxwell distribution. As a result of effects to be mentioned hereinafter, however, an excess of fast electrons can arise which means that there are more fast electrons in the beam than corresponds to the Maxwell distribution. This excess of fast electrons causes a detrimental influence of the beam current inertia and hence of the response rate.

An effect by which fast electrons can be formed is X-ray radiation as a result of electrons of the electron beam impinging upon the anode. This X-ray radiation can liberate fast electrons from the cathode. Another effect by which fast electrons can be formed is the formation of positive ions by the electrons of the electron beam. These ions move towards the cathode and there also liberate fast electrons. A third effect by which fast electrons can be formed is interaction between the electrons of the electron beam mutually. It has been found that this latter effect is a very important cause of an excess of fast electrons. Said interactions which may be compared with collisions take place, for example, between two electrons moving one after the other and following tracks which intersect each other at an angle. By the mutual repelling, the front electron will start moving faster and the rear one slower, as a result of which an excess of fast electrons is formed.

In the article ("A Light-weight Experimental Colour Television Camera") in Phillips Technical Review vol. 29, 1968, nr. 11, a device of the type mentioned in the first paragraph is described. In this device, the electron beam which is produced by an electron gun having a cathode, a grid and an anode, is focused by the electric field between said electrodes in a so-called cross-over approximately at the area of the anode. The apertures in the grid and the anode are simple cylindrical apertures and the anode forms one assembly with the first electrode of the focusing lens and is at a voltage of 300 volt. By the focusing lens the said cross-over is reproduced on the photoconductive layer. Although this device has already a rather good response rate, it can be improved all the same.

It is an object of the invention to provide a device of the type mentioned in the first paragraph, in which the beam current inertia is as small as possible.

According to the invention, a device having a television camera tube, which television camera tube comprises, centered along an axis, an electron gun having a cathode and an anode provided with an aperture for producing an electron beam, and a focusing lens for focusing the electron beam on a photoconductive layer which is provided on a signal plate, on which photoconductive layer a potential distribution is formed by projecting on it an optical image, said signal plate supplying electric signals corresponding to the said optical image by the scanning of the photoconductive layer by the electron beam, is characterized in that during the scanning the current density of the electron beam in any point along the axis between the cathode and the anode, is at most three times the current density in the point of intersection of the axis with the cathode.

The invention is based on the discovery that it is of importance for reducing the beam current inertia to restrict the number of interactions between electrons of the electron beam. If the beam forms a cross-over in the electron gun, as is the case in the above-mentioned known device, many interactions take place in the proximity of said cross-over by which the beam current inertia is adversely influenced. By ensuring that there is no cross-over, which implies that the current density of the electron beam in the direction from the cathode to the anode does not increase or increases scarcely and rather even decreases, the beam current inertia is considerably reduced. A further advantage of the absence of the cross-over is that the alignment of the electron gun is less critical.

A device according to the invention is preferably constructed so that the voltage at the anode is at most 125 volt positive relative to the cathode.

This aspect of the invention is based on the discovery that the kinetic energy which is transferred on an average from one electron to the other during the interactions, is larger as the average kinetic energy of the electrons in the beam is larger. By giving the voltage at the anode a low value, the influence of the interactions can thus be restricted. Another advantage of a low anode voltage is that if the anode is combined with the first electrode of the focusing lens, the quotient of voltages at the last electrode and on the first electrode of the focusing lens may be large. This causes a considerable reduction of the length of the television camera tube, as is obvious from U.S. application Ser. No. 176,016, filed 8-30-71, now abandoned, filed simultaneously with this patent application.

A television camera tube for a device according to the invention is preferably constructed so that the electron gun comprises a grid between the cathode and the anode, which grid has an aperture which, at the area of the narrowest cross-section, has a diameter which is at least 20 times as large as the aperture in the anode at the area of the narrowest cross-section.

Since the scanning of the photoconductive layer generally takes place according to a pattern of parallel lines, it is necessary to reduce the beam current to substantially zero for a short period of time, during the time elapsing between the scanning of the end of a line and the beginning of the next line. The suppression of the beam current during this flyback, can be carried out by means of the anode voltage. This, however, has drawbacks, because the anode voltage in general also influences the focusing lens. The voltage pulses on the anode would thus have to be very steep to prevent influencing of the focusing during the scanning of the beginning and the end of the lines. It is therefore of advantage, although this is not necessary to avoid a cross-over in the electron gun, to use a grid having an aperture which is large relative to the aperture in the anode, so that the beam current can be suppressed by means of a large negative voltage pulse at the grid. Furthermore it is possible by means of this grid to form a cross-over during flybacks to discharge picture elements of the photoconductive layer - which receive very much light and therefore are charged too strongly - to a certain degree during flybacks as is described in U.S. application Ser. No. 798,018 filed Feb. 10, 1969, now Pat. No. 3,548,250.

A television camera tube according to the invention is furthermore constructed so that the aperture in the anode on the side of the grid has a larger diameter than at the area of the narrowest cross-section.

In connection with the requirements which the current density along the axis of the electron beam must satisfy according to the invention, the electric field between the cathode and the anode should be substantially homogeneous. The optimum field configuration is found to be achievable with the said shape of the aperture in the anode.

A television camera tube according to the invention is preferably constructed so that the aperture in the anode comprises a substantially circular cylindrical part at the area of the narrowest cross-section and a substantially circular cylindrical part on the side of the grid.

By causing the aperture in the anode to consist of cylindrical parts, an electrode configuration which causes the desirable field configuration is formed in a structurally simply realizable manner.

An advantageous construction of a television camera tube according to the invention is finally so that the cathode load during the scanning is at least 0.5 A/sq,cm.

By using a high cathode load, the aperture in the anode may be very narrow. The reproduction hereof determines the size of the target of the electron beam on the photosensitive layer. This spot therefore becomes very small which is favourable for the resolving power of the camera tube.

The invention will now be described with reference to the accompanying drawing, in which.

Figure 1:
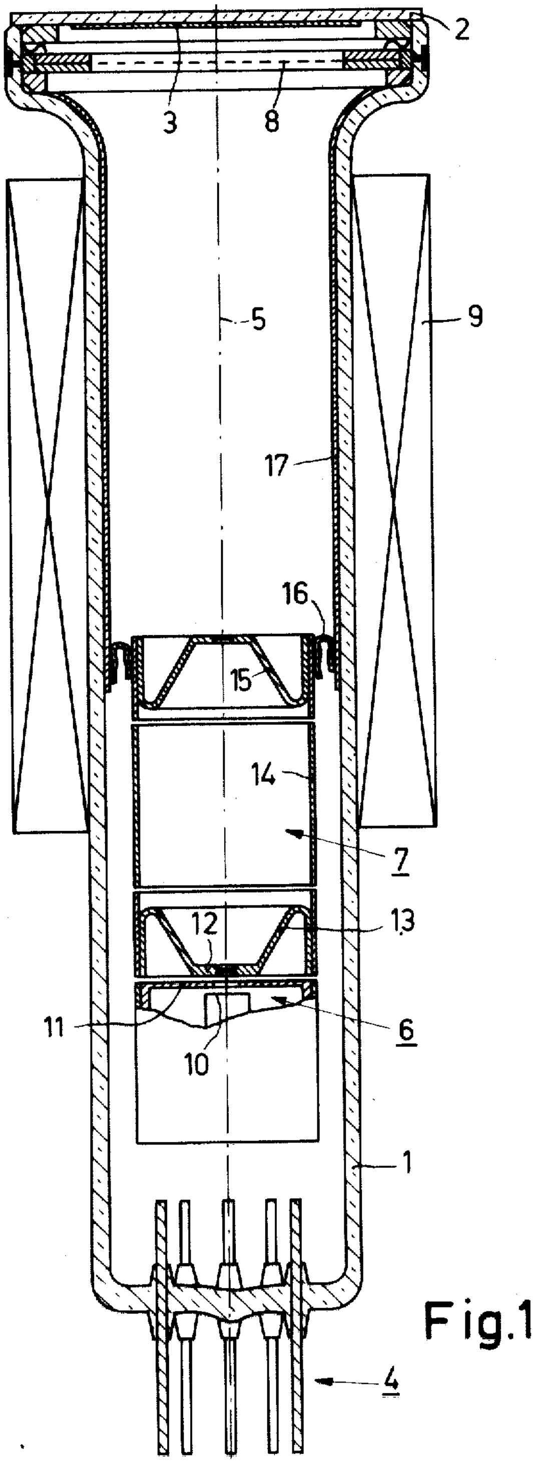
FIG. 1 shows a television camera tube according to the invention.

The camera tube shown in FIG. 1 is of the "Plumbicon" type and comprises a glass envelope 1 having on one side a front plate 2 on which a layer 3 is provided which consists of a photoconductive layer and a conductive transparent signal plate between the photosensitive layer and the said front plate 2. The photoconductive layer consists mainly of specially activated lead monoxide and the signal plate of conductive tin dioxide. The connection pins 4 of the tube are present on the other side of the envelope 1. The camera tube comprises, centered along an axis 5, an electron gun 6 and a focusing lens 7. The tube furthermore comprises a gauze electrode 8 to cause perpendicular landing of the electrons on the layer 3, as well as a set of deflection coils 9 which are shown diagrammatically. These deflection coils serve to deflect the electron beam produced by the electron gun 6 in two mutually perpendicular directions and are present around the envelope 1. The electron gun 6 comprises a cathode 10, a grid 11 and an anode 12. The connection of the said components and their connection to the connection pins 4 are not shown in the Figure to avoid complexity of the drawing.

Figure 2:
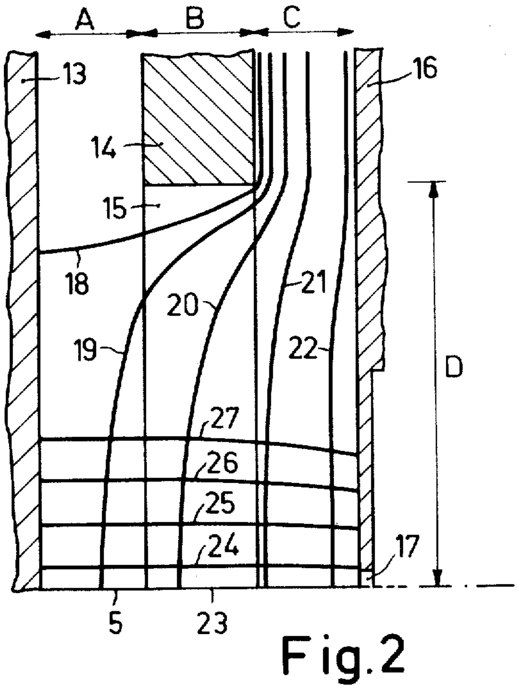
FIG. 2 shows diagrammatically an electron gun.

FIG. 2 shows an electrode configuration of an electron gun which is suitable for use in a television camera tube according to the invention. Since the electron gun is rotationally symmetrical, only the part of the configuration located on one side of the axis of symmetry is shown. The electron gun comprises a cathode 13, a grid 14 having a cylindrical aperture 15, and an anode 16 having a cylindrical aperture 17. The diameter of the aperture 15 (twice the indicated distance D) is 0.750 mm. The diameter of the aperture 17 is 0.020 mm. The length of the aperture 17 (along the axis 5) is 0.015 mm. The distances between the electrodes are denoted by A and C, which distances are both 0.100 mm. The thickness B of the grid 14 is also 0.100 mm. The voltage at the grid 14 is 6.5 V negative relative to the cathode 13, and the voltage at the anode 16 is 50 volt positive relative to the cathode 13. In the Figure a few equipotential lines are denoted by 18, 19, 20, 21 and 22; the associated voltages are 0, 5, 15, 30 and 45 volts positive, respectively, relative to the cathode. Reference numerals 23, 24, 25, 26 and 27 denote a few electron paths which all start at right angles from the cathode 13. The electron path 23 extends along the axis 5 of the electron gun. It appears from the Figure that the electron paths extend substantially parallel but still slightly converge. During the flyback of the electron beam, the voltage at the grid 14 is made strongly negative relative to the cathode 13 (−175 volt) as a result of which the beam current is reduced to zero.

Figure 3:
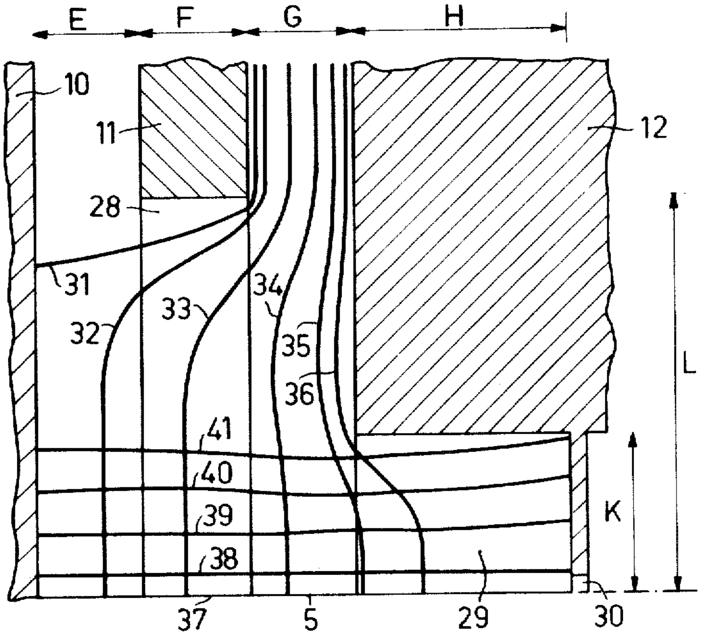
FIG. 3 shows diagrammatically the electron gun of the tube shown in FIG. 1.

FIG. 3 shows in the same manner the electron configuration which is used in the tube shown in FIG. 1. The configuration shown in FIG. 3 is to be preferred to that shown in FIG. 2 for application in a television camera tube according to the invention. Shown in the Figure are the cathode 10, the grid 11 having a cylindrical aperture 28 and the anode 12 having an aperture which comprises the cylindrical parts 29 and 30. The diameter of the aperture 28 (twice the indicated distance L) is 0.750 mm. The diameter of aperture 29 (twice the indicated distance K) is 0.30 mm and the diameter of the aperture 30 is 0.020 mm. The length of the aperture 30 (along the axis 5) is 0.015 mm. The remaining distances in the Figure are E = F = G = 0.100 mm, and H = 0.200 mm. Of course, the electrode configuration can be uniformly increased or decreased while maintaining the electron-optical properties. The voltage at the grid 11 is 6.5 volt relative negative to the cathode 10 and the voltage at the anode 12 is 50 volts positive relative to the cathode 10. Reference numerals 31, 32, 33, 34, 35 and 36 denote equipotential lines with 0, 5, 15, 30, 40 and 45 volts positive, respectively, relative to the cathode. Reference numerals 37, 38, 39, 40 and 41 denote electron paths which all start at right angles from the cathode 10. The electron path 37 extends along the axis 5 of the electron gun. It appears from the Figure that the electron paths extend substantially in parallel but now slightly diverge. As a result of this there are even fewer interactions between the electrons. Furthermore it follows from the experiments from which FIG. 3 has been derived that the field strength on the side of the cathode of the aperture 30 is extremely small by the influence of aperture 29. If the field strength on the other side of the aperture 30 is zero, the aperture 30 may be represented by a so-called thin lens having a focal distance of approximately 14 mm, which is very large relative to the dimensions of the electron gun. By making the field strength on either side of the aperture 30 approximately equal, an even larger focal distance can be achieved. As a result of the large focal distance, the aperture 30 has substantially no lens effect and consequently causes substantially no aberrations. During the flyback of the electron beam, the voltage at the grid 11 is made strongly negative relative to the cathode 10 (−175 volt), as a result of which the beam current is reduced to zero.

Figure 4:
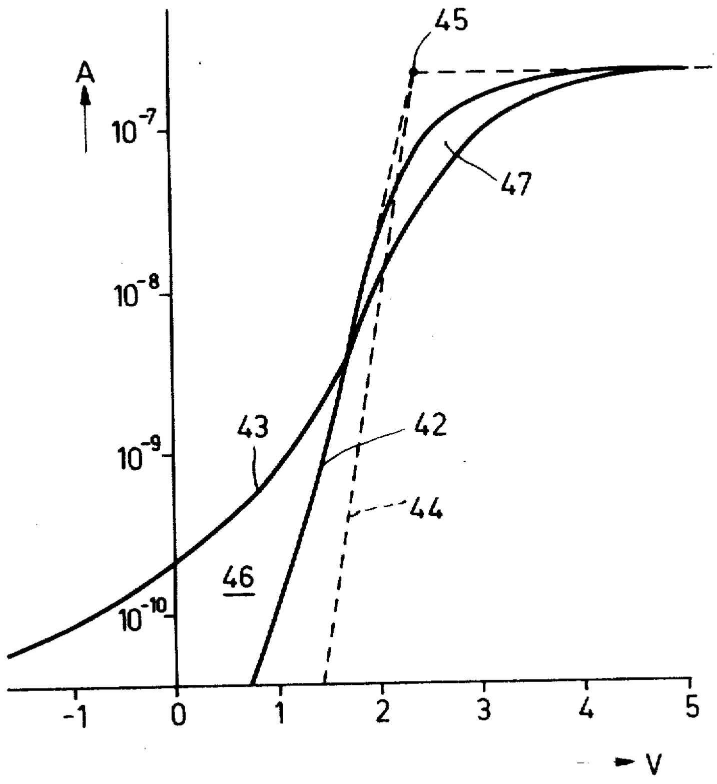
FIG. 4 is a graphic representation of the speed distribution of the electrons in the form of a few acceptance curves.

FIG. 4 shows a few acceptance curves. An acceptance curve is to be understood to mean herein the curve which shows the relationship between the current strength which the photosensitive layer accepts and the voltage which the photosensitive layer has relative to the cathode. The acceptance curve is in close relationship with the speed distribution of the electrons in the beam. For a sufficiently large positive voltage of the photosensitive layer, the full beam current is actually accepted. The lower the voltage of the photosensitive layer (the more negative), the faster the electrons must be to be able to reach the photosensitive layer and thus the smaller the accepted current strength becomes. If for the acceptance curve the logarithm of the accepted current is plotted against the voltage of the photosensitive layer, the acceptance curve for a true Maxwell distribution consists of a straight part having a slope which is determined by the temperature of the cathode, changing with a bend into a straight part which denotes that the whole beam current is accepted. The steeper the first-mentioned section is, the lower is the associated cathode temperature. An access of fast electrons produces a so-called tail at the acceptance curve at low voltages as a result of which the photosensitive layer can even be charged negatively. Reference numeral 42 in the Figure denotes the acceptance curve of the device according to the invention. The voltage of the photosensitive layer is plotted horizontally in volts on a linear scale and the accepted current is plotted vertically in amperes on a logarithmic scale. For comparison the figure also shows the acceptance curve of the known device, which is denoted by 43 and the acceptance curve 44 which can be calculated for an ideal Maxwell distribution at the cathode temperature (1250°K) which is used in the device according to the invention. The curve 44 is drawn starting from the point 45 which is found as the point of intersection of the tangent lines at the curve 42. The regions 46 and 47 in the Figure denote the improvement which is obtained by the invention. This improvement corresponds to such an increase of the response rate that the remaining signal which is left after 60 ms (generally one and a half times the time elapsing between two successive scans of a picture element) if the exposure of the photosensitive layer is reduced stepwise to zero, has become smaller approximately by a factor two.

What is claimed is:

1. In combination a television camera tube, said tube comprising, aligned along an axis, an electron gun having a cathode and an anode which is provided with an aperture of given cross-section for producing an electron beam, a focusing lens for focusing the electron beam, a signal plate, a photoconductive layer on the signal plate, means to project an optical image on said photoconductive layer to form a potential distribution corresponding to said optical image, means to scan said signal plate with said electron beam to produce electric signals corresponding to the said optical image, and means to apply potentials to said cathode and anode which produce a substantially homogeneous electric field therebetween whereby during scanning the current density of the electron beam at any point along the axis between the cathode and the anode, is at most three times the current density at the point of intersection of the axis with the cathode.

2. The combination as claimed in claim 1, wherein a potential is applied to the anode which is at most 125 volt positive relative to the cathode.

3. The combination as claimed in claim 2, wherein the electron gun includes a grid between the cathode and the anode, said grid having an aperture which has a diameter at an area of minimum cross-section at least 20 times as large as that of the aperture in the anode.

4. The combination as claimed in claim 3, wherein the aperture in the anode on the side of the grid has a larger diameter than at the area of minimum cross-section.

5. The combination as claimed in claim 4, wherein the anode comprises a substantially circular cylindrical part defining an aperture having an area of minimum cross-section and a substantially circular cylindrical part on the side facing the grid defining an aperture having an area of larger cross-section than said minimum.

6. The combination as claimed in claim 5, wherein the cathode beam current density during scanning is at least 0.5 A/sq.cm.

* * * * *

PO-1050
(5/69)

UNITED STATES PATENT OFFICE
CERTIFICATE OF CORRECTION

Patent No. 3,831,058 Dated August 20, 1974

Inventor(s) JOHANNES H.T. VAN ROOSMALEN

It is certified that error appears in the above-identified patent and that said Letters Patent are hereby corrected as shown below:

On the title page insert --[73] Assignee: U.S. Philips Corporation, New York, N.Y.-- and insert --[30] Foreign Application Priority Data

Sept. 4, 1970 Netherlands..........7013098--

Signed and sealed this 22nd day of April 1975.

(SEAL)
Attest:

RUTH C. MASON
Attesting Officer

C. MARSHALL DANN
Commissioner of Patents
and Trademarks

PO-1050
(5/69)

UNITED STATES PATENT OFFICE
CERTIFICATE OF CORRECTION

Patent No. 3,831,058 Dated August 20, 1974

Inventor(s) JOHANNES H.T. VAN ROOSMALEN

It is certified that error appears in the above-identified patent and that said Letters Patent are hereby corrected as shown below:

In the drawing change the name of the inventor from "JAN M. VAN DE GRIEND" to read --JOHANNES H.T. VAN ROOSMALEN--.

Signed and sealed this 27th day of May 1975.

(SEAL)
Attest:

RUTH C. MASON
Attesting Officer

C. MARSHALL DANN
Commissioner of Patents
and Trademarks